(12) United States Patent
Wada et al.

(10) Patent No.: US 9,255,778 B2
(45) Date of Patent: Feb. 9, 2016

(54) GAUGE APPARATUS HAVING PROFILE ASSEMBLY

(71) Applicant: Honda Motor Co., Ltd., Tokyo (JP)

(72) Inventors: Ali Wada, Barrie (CA); Joseph Zarb, Alliston (CA); Dale Quinn, Egbert (CA)

(73) Assignee: Honda Motor Co., Ltd., Tokyo (JP)

( * ) Notice: Subject to any disclaimer, the term of this patent is extended or adjusted under 35 U.S.C. 154(b) by 264 days.

(21) Appl. No.: 13/711,078

(22) Filed: Dec. 11, 2012

(65) Prior Publication Data

US 2014/0157611 A1 Jun. 12, 2014

(51) Int. Cl.
| | | |
|---|---|---|
| *G01D 21/00* | (2006.01) | |
| *G01B 3/26* | (2006.01) | |
| *G01B 3/28* | (2006.01) | |
| G01B 5/14 | (2006.01) | |
| G01B 5/00 | (2006.01) | |
| F01L 1/20 | (2006.01) | |

(52) U.S. Cl.
CPC .. *G01B 3/26* (2013.01); *G01B 3/28* (2013.01); *G01B 5/003* (2013.01); *F01L 1/20* (2013.01); *G01B 5/0032* (2013.01); *G01B 5/14* (2013.01)

(58) Field of Classification Search
CPC ............ G01B 5/0032; G01B 5/14; F01L 1/20
USPC .................... 33/611, 605, 604, 600
See application file for complete search history.

(56) References Cited

U.S. PATENT DOCUMENTS

| | | | |
|---|---|---|---|
| 1,257,483 A | | 2/1918 | Hart et al. |
| 1,876,280 A | * | 9/1932 | Dunn ............................. 33/611 |
| 1,891,364 A | | 12/1932 | Frans |
| 1,891,365 A | | 12/1932 | Frans |
| 1,996,092 A | * | 4/1935 | Albertson et al. .............. 33/611 |
| 2,541,758 A | | 8/1948 | Hahn |
| 2,474,294 A | | 6/1949 | Norma |
| 2,521,966 A | | 9/1950 | Clayborne |
| 2,553,129 A | | 5/1951 | Burnett |
| 2,557,840 A | | 6/1951 | Preslan |
| 2,642,670 A | * | 6/1953 | Dow ............................... 33/531 |
| 2,739,389 A | | 3/1956 | Carter |
| 2,855,692 A | * | 10/1958 | Campbell ........................ 33/607 |
| 3,116,560 A | * | 1/1964 | Matthews ........................ 33/534 |
| 3,708,885 A | | 1/1973 | Christ |
| 4,034,478 A | | 7/1977 | Yager |
| 4,139,947 A | | 2/1979 | Possati |

(Continued)

FOREIGN PATENT DOCUMENTS

| | | |
|---|---|---|
| CH | 599533 | 10/1977 |
| GB | 2069700 | 8/1981 |
| JP | 2006201145 | 8/2006 |

OTHER PUBLICATIONS

Office Action of CA Serial No. 2798380 dated Jul. 28, 2014, 2 pages.

*Primary Examiner* — Laura Martin
*Assistant Examiner* — Rhyan C Lange
(74) *Attorney, Agent, or Firm* — Rankin, Hill & Clark LLP

(57) ABSTRACT

A gauge apparatus includes an extension assembly. The gauge apparatus also includes a profile assembly configured to radially extend from an outer periphery of the extension assembly. The profile assembly is configured to reciprocally coaxially travel relative to the extension assembly. The profile assembly is configured to cease coaxial movement in response to making travel-interfering contact.

17 Claims, 7 Drawing Sheets

(56) References Cited

U.S. PATENT DOCUMENTS

| | | | |
|---|---|---|---|
| 4,630,377 A * | 12/1986 | Schneider et al. | 33/611 |
| 4,916,944 A | 4/1990 | Ho-Chuan | |
| 4,982,505 A | 1/1991 | Pocci | |
| 5,189,808 A * | 3/1993 | Evans et al. | 33/836 |
| 5,251,381 A * | 10/1993 | Turner et al. | 33/538 |
| 5,758,433 A | 6/1998 | Alberts | |
| 6,151,792 A * | 11/2000 | Ohlig et al. | 33/613 |
| 6,698,105 B2 | 3/2004 | Shen et al. | |
| 7,104,121 B2 | 9/2006 | Firmin | |
| 8,087,181 B2 | 1/2012 | Rogers | |
| 2001/0009069 A1* | 7/2001 | Ishii | 33/199 R |
| 2010/0230598 A1* | 9/2010 | Moonen et al. | 250/341.6 |

* cited by examiner

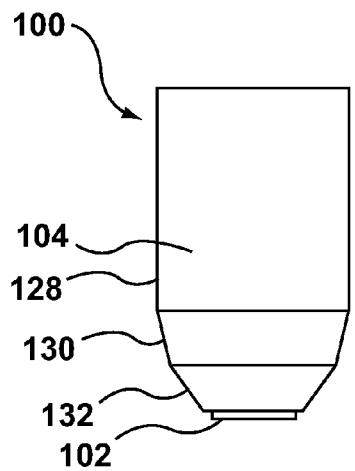
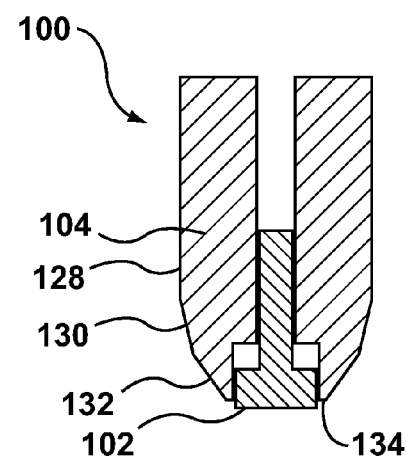
FIG. 5A  FIG. 5B
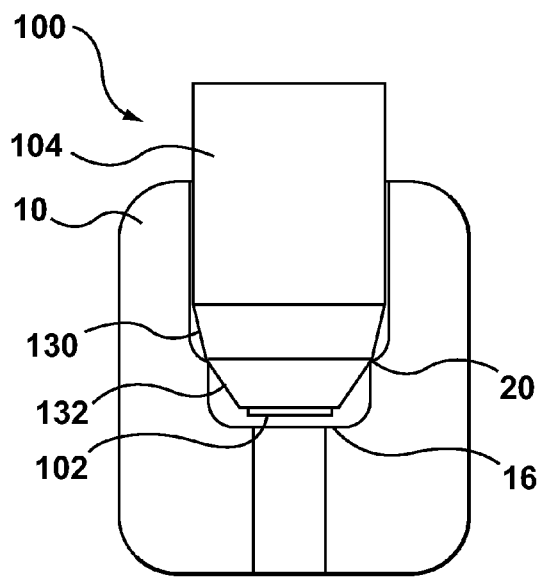
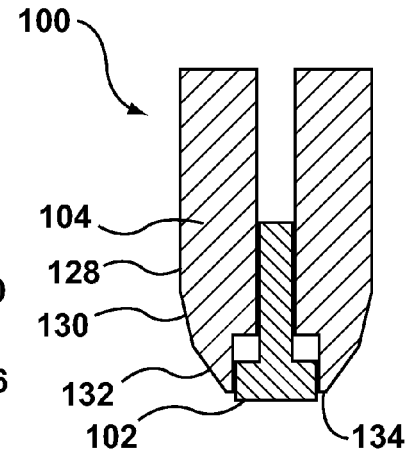
FIG. 5C  FIG. 5D

GAUGE APPARATUS HAVING PROFILE ASSEMBLY

TECHNICAL FIELD

Aspects generally relate to (and are not limited to) a gauge apparatus including (and not limited to) a profile assembly.

BACKGROUND

A cylinder block of a reciprocating engine is configured to provide motive force to a vehicle (car, truck). The cylinder block is an integrated structure including various machined components such as cylinders along with some or all of the associated surrounding structures (such as, coolant passages, intake and exhaust passages and ports, crankcase, etc.). The term engine block is often used synonymously with "cylinder block" although technically distinctions can be made between the cylinder block as a discrete unit versus the engine block having integrated components.

Machining of the components used in the engine block includes various processes in which a piece of raw material is cut into a desired final shape and size by a controlled material-removal process. The many processes that have this common theme, controlled material removal, are today collectively known as subtractive manufacturing, in distinction from processes of controlled material addition, which are known as additive manufacturing. Traditional machining processes include: turning, boring, drilling, milling, broaching, sawing, shaping, reaming, tapping, etc. Machine tools, such as lathes, milling machines, drill presses, or others, are used with a sharp cutting tool to remove material to achieve a desired geometry. Newer machining technologies include: electrical discharge machining, electrochemical machining, electron beam machining, photochemical machining, and ultrasonic machining.

A gauge or gage is used widely in metalworking. The gauge is a device (tool) used to make measurements on a machined component, such as the engine block. A wide variety of gauges exist which serve such functions, ranging from simple pieces of material against which sizes can be measured to complex pieces of machinery. There are two types of gauges (measuring tools): direct and indirect. Due to the realities of machining metal pieces, most measurements are of the plus/minus type; for example, the plus/minus type measurement may be recorded as 2.125 inches+/−0.0005 inches (42.00 mm+/−0.005 mm). The first number is the preferred size (dimension). The +/− number is the amount of variation between the preferred size and an acceptable size (preferred or target size). During inspection of a part or machined component, the preferred dimension is given. After measuring the machined component, a comparison is made between the measured size and the acceptable size to determine whether the measured dimension of the machined component is acceptable or not acceptable (and if found not acceptable, the machined component is rejected).

Accurate measurement of engine components, such as the dimensional aspects of the machined components used in the engine block, is critical to properly manufacture an acceptable engine block, both in terms of longevity and performance as well as profitability. Unfortunately, a component that was improperly machined and then inaccurately gauged (measured) adds unwanted time and/or cost to the process of manufacturing the engine block (or other components used in the vehicle).

SUMMARY

We, the inventors, have researched a problem associated with known gauges. After much study, we believe we have arrived at an understanding of the problem and its solution, which are stated below.

Unfortunately, after machining a component, a vestige (an unwanted feature) may inadvertently remain with the component. The vestige is a very slight trace or amount of something left over as a result of a machining process applied to a component. The vestige is machined due to the way the machining tools are designed. For the case where the dimension (size) of the vestige is small enough, the vestige does not compromise the integration (assembly) of the machined component with the engine block. Unfortunately, for the case where the dimension of the vestige is large enough, the vestige may compromise the integration of the machined component with the engine block, leading to an undesired increase in manufacturing cost.

For example, a pocket is machined (formed) in a head of an engine block. In addition, a seat is a desired feature machined in the pocket. During the process of machining the pocket and the seat, a step (an example of the vestige) or circumferential ledge is inadvertent (undesirably) machined into the side wall of the pocket. The step, if sized large enough, may unfortunately interfere with the proper or desired use of the seat. The seat in the pocket allows a valve seat (another machined component) to be pressed into the pocket of the head of the engine block. For the case where the step is dimensionally large enough, the valve seat cannot be fully (properly) pressed into the pocket, and this may lead to negative consequences, such as the engine block not operating within acceptable performance parameters; this condition unfortunately leads to diagnosing and reworking (machining or outright wastage) of the engine block, thus undesirably increasing manufacturing costs.

The inventors have developed a gauge apparatus configured to measure or detect the presence of a vestige (such as the step). Once the vestige is detected, appropriate adjustments may be made to the machine tools used for machining the component (such as the engine block defining the pocket and the seat). In this manner, future possibility is reduced (preferably prevented) for machining the vestige (the step) that has an undesirable large dimension that causes unwanted increase in manufacturing defects and/or costs.

In order to mitigate the above, at least in part, in accordance with an aspect of our work, we (the inventors) have developed a gauge apparatus that includes an extension assembly. The gauge apparatus also includes a profile assembly configured to radially extend from an outer periphery of the extension assembly. The profile assembly is configured to reciprocally coaxially travel relative to the extension assembly. The profile assembly is configured to cease coaxial movement in response to making travel-interfering contact.

In order to mitigate the above, at least in part, in accordance with another aspect of our work, we (the inventors) have developed a gauge apparatus including an extension assembly defining a groove. A profile assembly is configured to radially extend from an outer periphery of the extension assembly. The profile assembly is configured to reciprocally coaxially travel relative to the extension assembly. The profile assembly is configured to cease coaxial movement in response to making travel-interfering contact. Also included is a gauge-indicator assembly, a connector, a spring assembly, a linkage assembly, a piston assembly, an air-gauging circuit, and a frame assembly. The frame assembly is configured to support the gauge-indicator assembly. The frame assembly supports the air-gauging circuit. The frame assembly abuts (rests against) the extension assembly. The piston assembly is configured to interact with the air-gauging circuit. The linkage assembly connects the piston assembly to the profile assembly. The spring assembly is positioned between the piston assembly and the extension assembly. The spring assembly biases the profile assembly in a retracted position. The connector slidably connects the profile assembly to the extension assembly in cooperation with the groove, so that the profile assembly 104 slides axially relative to the extension assembly.

In order to mitigate the above, at least in part, in accordance with additional aspects of our work, we (the inventors) have developed a gauge apparatus including the various features as identified in the claims.

Other aspects and features of the non-limiting embodiments may now become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIGS. 4A, 4B, 4C, 4D, 5A, 5B, 5C, 5D depict schematic examples of cross-sectional views of a tip portion of the gauge apparatus of FIG. 1A.

Figure 1A:
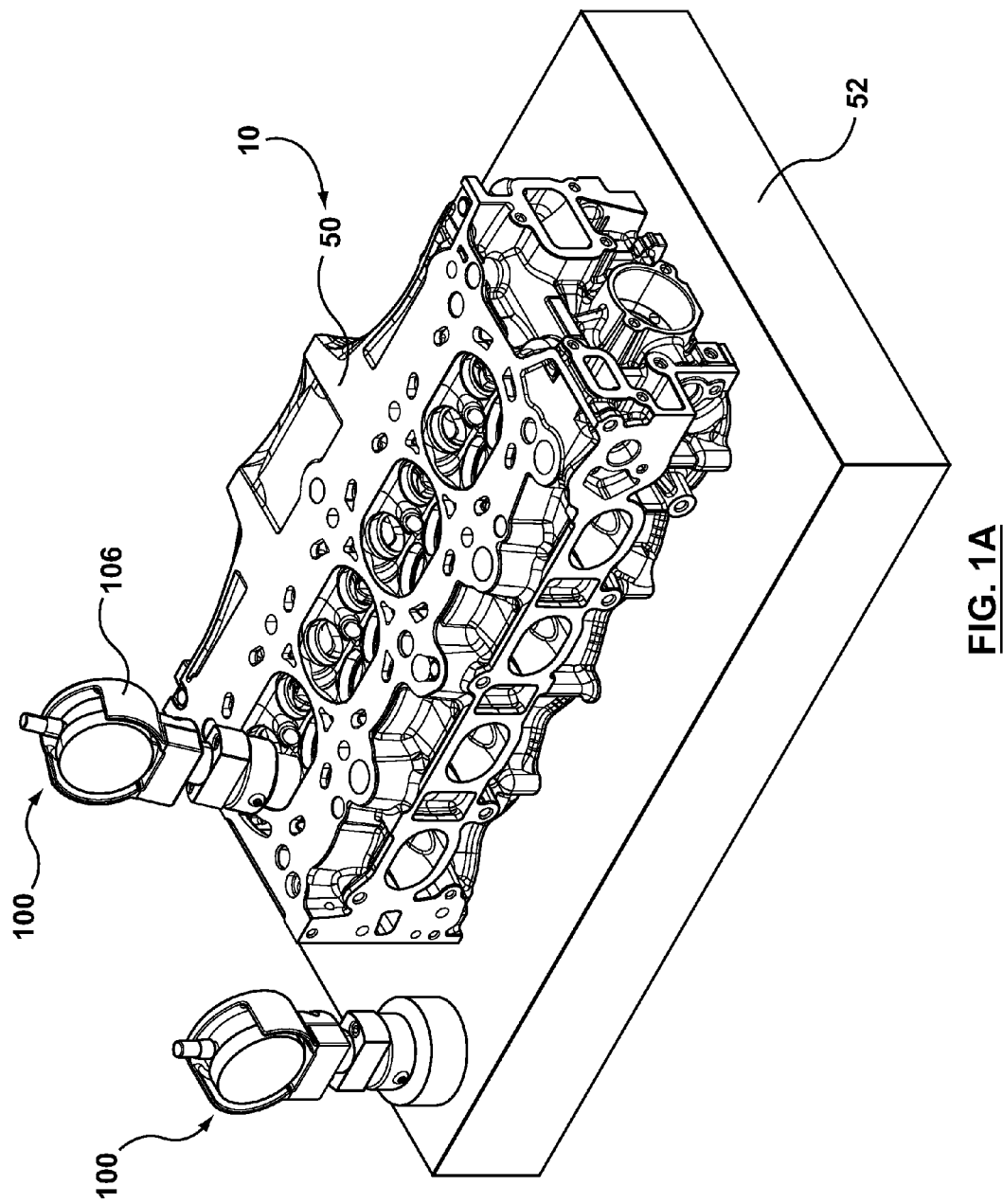
FIG. 1A depicts a schematic example of a perspective view of a gauge apparatus.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE EXEMPLARY EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples), aspects and/or concepts defined in the appended claims. Hence, specific dimensions and other physical characteristics relating to the embodiments disclosed herein are not to be considered as limiting, unless the claims expressly state otherwise.

FIG. 1A depicts a schematic example of a perspective view of a gauge apparatus 100. The gauge apparatus 100 is configured to gauge (measure) aspects of a component 10. An example of the component 10 includes (and is not limited to) an engine-block assembly 50 of a vehicle (such as a car or truck). The engine-block assembly 50 is positioned on a support base 52. The support base 52 is configured to support the position of the engine-block assembly 50 while manufacturing operations or processes are performed on the engine-block assembly 50. A first instance of the gauge apparatus 100 (depicted on the right side of FIG. 1A) is in use with the component 10. A second instance of the gauge apparatus 100 (depicted on the left side of FIG. 1A) is depicted in a storage position, ready for use. The gauge apparatus 100 includes (and is not limited to) a gauge-indicator assembly 106 configured to provide (display) a measurement indication (to the user). The gauge-indicator assembly 106 may have an interface configured to operatively connect the gauge apparatus 100 to a computer system (not depicted but known) if so required to log or record measurements and/or indications provided by gauge apparatus 100. The engine-block assembly 50 includes holes, pockets, and voids formed by manufacturing (machining) processes such as drilling, casting, etc. The gauge apparatus 100 may be used to measure and/or gauge the sizes (dimensions) of specific manufactured features associated with the engine-block assembly 50.

Figure 1B:
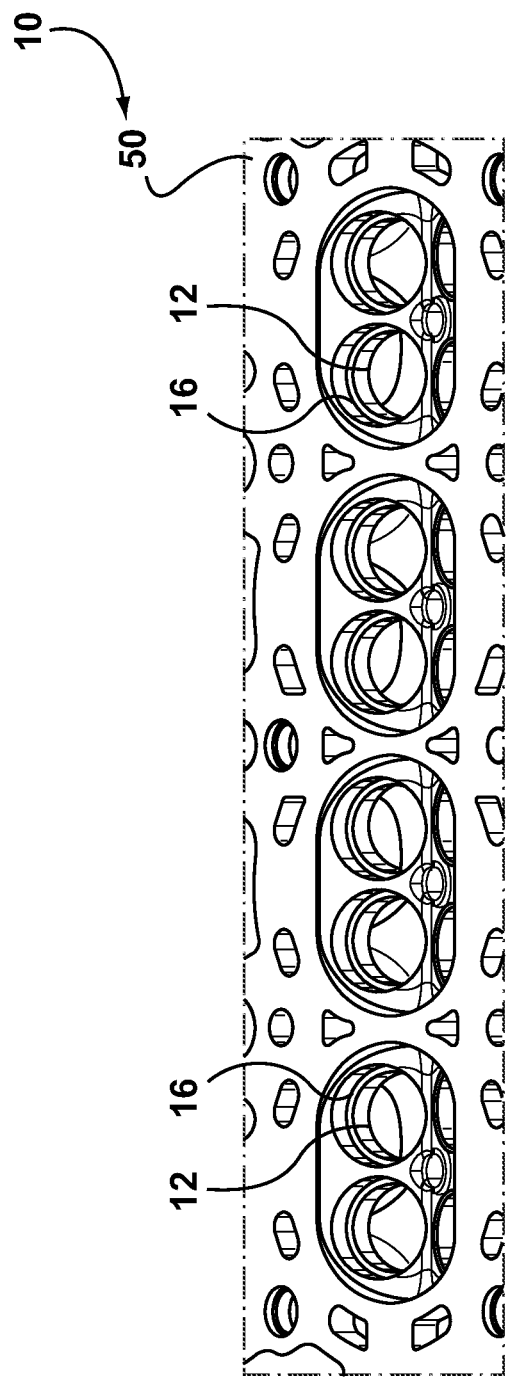
FIG. 1B depicts a schematic example of a perspective view of an engine block for use with the gauge apparatus of FIG. 1A.

FIG. 1B depicts a schematic example of a perspective view of an engine-block assembly 50 for use with the gauge apparatus 100 of FIG. 1A. The engine-block assembly 50 defines several instances of a hole 12 (also called a pocket), and also defines several instances of a stop ledge 16 each positioned or formed in a respective instance of the hole 12. The stop ledge 16 may be called a step ledge. For the case where the vestige machined in the hole 12 has a size or dimension that is not within an acceptable tolerance level, the vestige may interfere with components that may need to interact (contact) with the stop ledge 16 in the hole 12; this case may lead to unacceptable operation of the engine-block assembly 50.

Figure 2A:
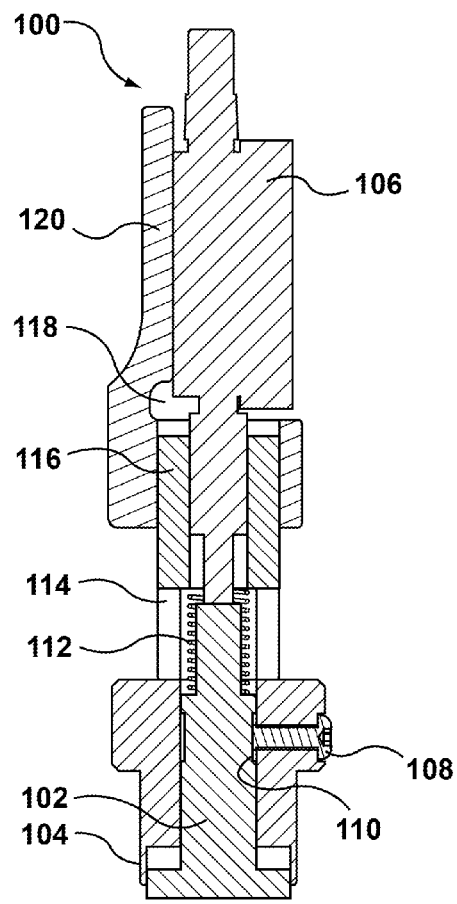
FIGS. 2A, 2B, 2C depict schematic examples of cross-sectional views of the gauge apparatus of FIG. 1A.
Figure 2B:
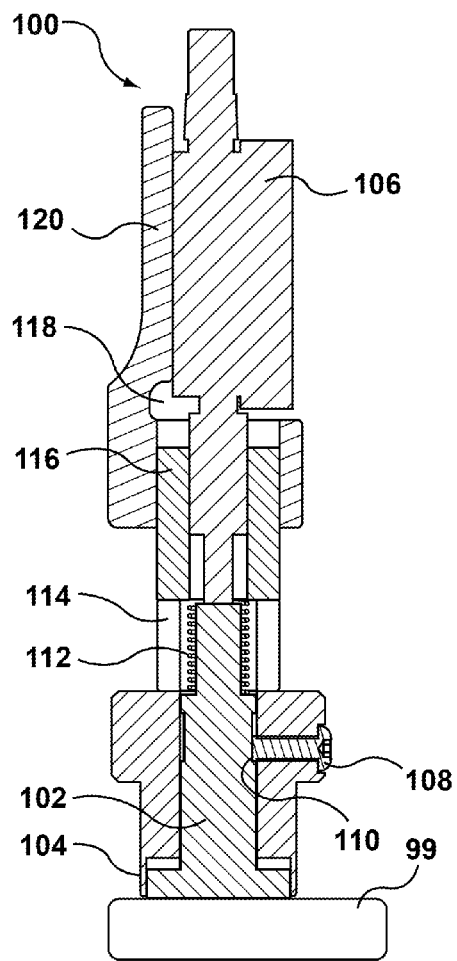
Figure 2C:
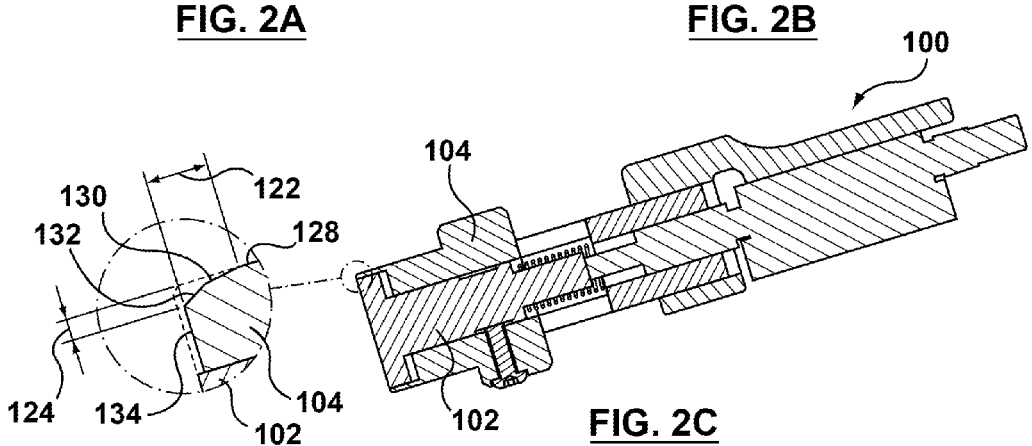

FIGS. 2A, 2B, 2C depict schematic examples of cross-sectional views of the gauge apparatus 100 of FIG. 1A. According to the examples depicted in FIGS. 2A, 2B, 2C, the gauge apparatus 100 includes (and is not limited to): an extension assembly 102, a profile assembly 104, a gauge-indicator assembly 106, a connector 108, a spring assembly 112, a linkage assembly 114, a piston assembly 116, an air-gauging circuit 118, and a frame assembly 120. A groove 110 is defined in/on the extension assembly 102. More specifically, the groove 110 is defined on an outer surface of the extension assembly 102. The groove 110 has a depth that extends axially relative to the extension assembly 102. According to the example depicted in FIG. 2A, the profile assembly 104 takes on the form of a piston having a piston head, and the profile assembly 104 takes on the form of a sleeve that is configured to axially (slidably) receive the extension assembly 102.

FIG. 2A depicts the gauge apparatus 100 in which the profile assembly 104 is placed in a retracted position, such that the end portion (the end face 134) of the profile assembly 104 is set apart from the end portion (the end face) of the extension assembly 102. FIG. 2B depicts the gauge apparatus 100 in which the end portion of the profile assembly 104 is placed in a protracted position, such that the profile assembly 104 is positioned in a coplanar arrangement (side by side) with the end portion of the extension assembly 102.

According to a specific example (detailed option), the gauge apparatus 100 includes (and is not limited to): an extension assembly 102 defining a groove 110, a profile assembly 104, a gauge-indicator assembly 106, a connector 108, a spring assembly 112, a linkage assembly 114, a piston assembly 116, an air-gauging circuit 118, and a frame assembly 120. The profile assembly 104 is configured to radially extend from an outer periphery of the extension assembly 102. The profile assembly 104 is configured to reciprocally coaxially travel relative to the extension assembly 102. The profile assembly 104 is configured to cease coaxial movement in response to the profile assembly 104 making travel-interfering contact; that is, the profile assembly 104 makes contact with an object (the vestige) that interferes with movement of the profile assembly 104. The frame assembly 120 is configured to support the gauge-indicator assembly 106. The frame assembly 120 supports the air-gauging circuit 118. The frame assembly 120 rests or abuts the extension assembly 102. The piston assembly 116 is configured to interact with the air-gauging circuit 118. The linkage assembly 114 connects the piston assembly 116 to the profile assembly 104. The spring assembly 112 is positioned between the piston assembly 116 and the extension assembly 102. The spring assembly 112 biases the profile assembly 104 in the retracted position; that is, the spring assembly 112 urges the profile assembly 104 to move toward the air-gauging circuit 118. The connector 108 slidably connects the profile assembly 104 to the extension assembly 102 in cooperation with the groove 110, so that the profile assembly 104 slides axially relative to the extension assembly 102. The connector 108 is received in a passageway defined by (as side wall of) the profile assembly 104. The connector 108 connects or couples with the groove 110 so that the connector 108 slides along the groove 110 without releasing from the groove 110 along a radial direction. The connector 108 allows the profile assembly 104 to slide axially relative to the extension assembly 102 (upwardly or downwardly).

In operation, the operator (human, user) manually handles the profile assembly 104 so as to pull the profile assembly 104 downwardly (as depicted in FIG. 2B) to a measurement position. When the operator manually releases the profile assembly 104, the spring assembly 112 urges the profile assembly 104 upwardly, so that the profile assembly 104 may return to a home position as depicted in FIG. 2A.

According to general terms (with reference to FIGS. 2A and 2B), the gauge apparatus 100 includes (and is not limited to): an extension assembly 102, and a profile assembly 104. The profile assembly 104 is configured to radially extend from an outer periphery of the extension assembly 102. The profile assembly 104 is configured to reciprocally coaxially travel relative to the extension assembly 102. The profile assembly 104 is configured to cease coaxial movement in response to making travel-interfering contact. By way of example, the gauge apparatus 100 may further include (and is not limited to) the gauge-indicator assembly 106 operatively coupled to the profile assembly 104. The gauge-indicator assembly 106 is configured to indicate an amount travelled by the profile assembly 104 once the profile assembly 104 stops moving coaxially (is stopped from moving coaxially). It will be appreciated that the gauge-indicator assembly 106 is depicted (FIGS. 2A, 2B, 2C) as not facing toward the front view, but is oriented to face a side view. The profile assembly 104 is slidably coupled to the extension assembly 102. The profile assembly 104 is spring biased to the gauge-indicator assembly 106. The gauge-indicator assembly 106 is further configured to indicate an amount travelled by the profile assembly 104 once the profile assembly 104 stops moving coaxially.

FIG. 5C depicts a case in which the gauge-indicator assembly 106 indicates the amount travelled by the profile assembly 104 once the profile assembly 104 stops moving coaxially because the profile assembly 104 made contact with the vestige because the vestige is too large (dimensionally), and in this way the vestige interferes with movement of the profile assembly 104 (toward a zero-readout position). Specifically, as the profile assembly 104 moves toward the stop ledge 16, the profile assembly 104 stops further movement as a result of the profile assembly 104 making interfering contact with the radially-extending circumferential edge 20 (an example of the vestige). For the case where the vestige is too large, the profile assembly 104 does not contact the travel-interfering body 99 while extension assembly 102 does contact the travel-interfering body 99. For the case where the vestige is small enough, both the profile assembly 104 and the extension assembly 102 make contact with the travel-interfering body 99.

Referring now to FIG. 2B, the profile assembly 104 is configured to cease coaxial movement in response to making travel-interfering contact along an axial direction relative to axial movement of the profile assembly 104. The operator manually pulls (moves) the profile assembly 104 downwardly toward a travel-interfering body 99. The spring assembly 112 is compressed and the piston assembly 116 and the linkage assembly 114 are pulled downwardly as well. The air-gauging circuit 118 responds in the manner known to persons of skill in the art, in such a way that the gauge-indicator assembly 106 may provide an indication of the amount of distance travelled by the profile assembly 104. Examples of the air-gauging circuit 118 are described in U.S. Pat. Nos. 4,034,478, 7,104,121, and 8,087,181.

Referring now to FIG. 2C, the profile assembly 104 is configured to be positioned proximate to a distal end of the outer periphery of the extension assembly 102. The profile assembly 104 includes an axially-aligned surface 128, a first tapered surface 130, and a second tapered surface 132. The first tapered surface 130 extends from the axially-aligned surface 128. The second tapered surface 132 extends from the first tapered surface 130 to a distal end of the profile assembly 104. The combination of the first tapered surface 130 and the second tapered surface 132 has, in combination, an axial dimension 122 that extends axially relative to the profile assembly 104, and also has a radial dimension 124 that extends radially relative to the profile assembly 104. The profile assembly 104 also provides an end face 134 extending axially from the profile assembly 104, and the end face 134 may make contact with the travel-interfering body 99 (which is depicted in FIG. 2B). For the case where the end face 134 contacts the travel-interfering body 99 without the profile assembly 104 contacting an unwanted vestige (undesired machined flaw), the gauge-indicator assembly 106 provides a zero reading. For the case where the end face 134 does not contact the travel-interfering body 99 because the profile assembly 104 contacts the unwanted vestige, the gauge-indicator assembly 106 provides a non-zero reading (dimension larger than zero). More specifically, the first tapered surface 130 or the second tapered surface 132 of the profile assembly 104 may contact the vestige.

Figure 3A:
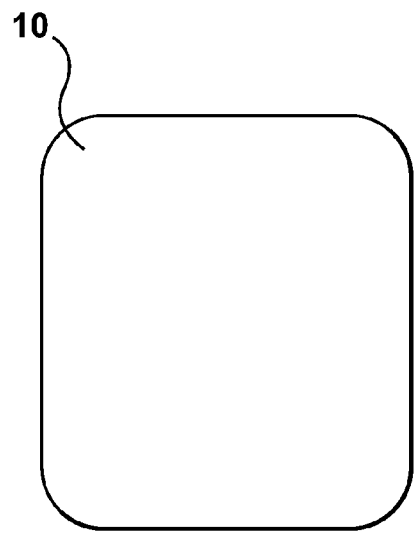
FIGS. 3A, 3B, 3C, 3D, 3E, 3F depict schematic examples of cross-sectional views of a component for use with the gauge apparatus of FIG. 1A.
Figure 3B:
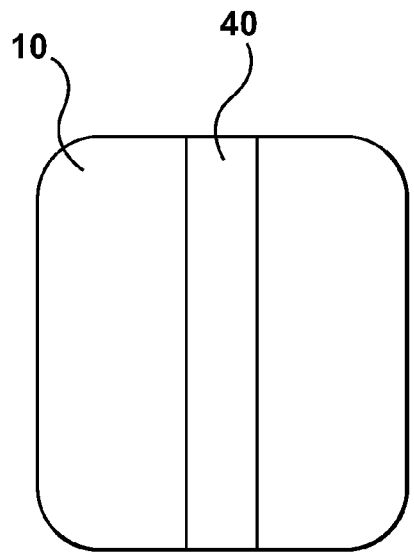
Figure 3C:
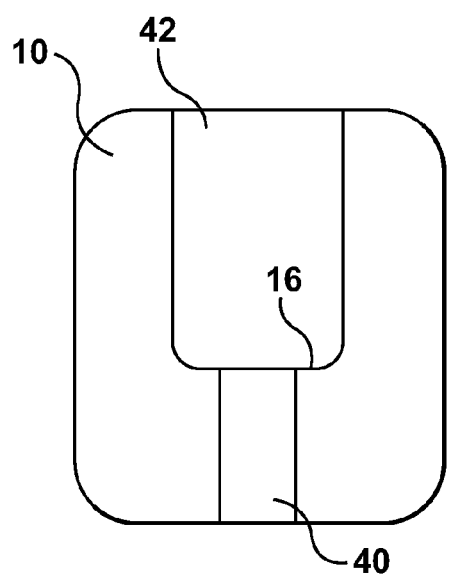
Figure 3D:
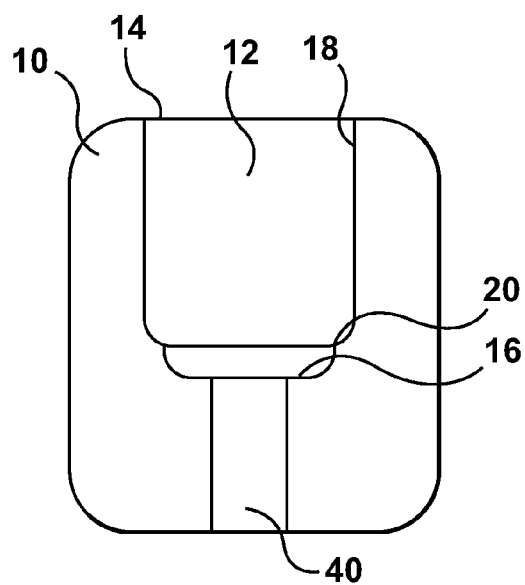

FIGS. 3A, 3B, 3C, 3D, 3E, 3F depict schematic examples of cross-sectional views of a component 10 for use with the gauge apparatus 100 of FIG. 1A. Referring now to FIG. 3A, there is depicted (by way of example) the component 10. The component 10 may include the engine-block assembly 50 of a vehicle (depicted in FIG. 1A). Referring now to FIG. 3B, a first hole 40 is drilled or formed (machined) through the component 10 (such as a block of steel). Referring now to FIG. 3C, a second hole 42 is drilled or formed (machined) coaxially (relative to the first hole 40) part way through the component 10. Referring now to FIG. 3D, the hole 12 (also known as the third hole) is drilled or formed (machined) coaxially (relative to the second hole 42) part way through the component 10.

The component 10 defines a hole 12 having a hole entrance 14 leading toward a stop ledge 16. The stop ledge 16 is set apart from the hole entrance 14. The component 10 has an inner surface 18 surrounding the hole 12. The component 10 also has a radially-extending circumferential edge 20 extending radially inward from the inner surface 18. By way of example, the travel-interfering contact includes an amount of vestige material formed (machined) from material not removed from the component 10 during a manufacturing process. The radially-extending circumferential edge 20 is an example of the vestige that is inadvertently formed (machined) as part of a scalloped edge or fillet edge defined in the hole 12 (as a result of machining operations applied to the component 10).

Figures 3E, 3F:
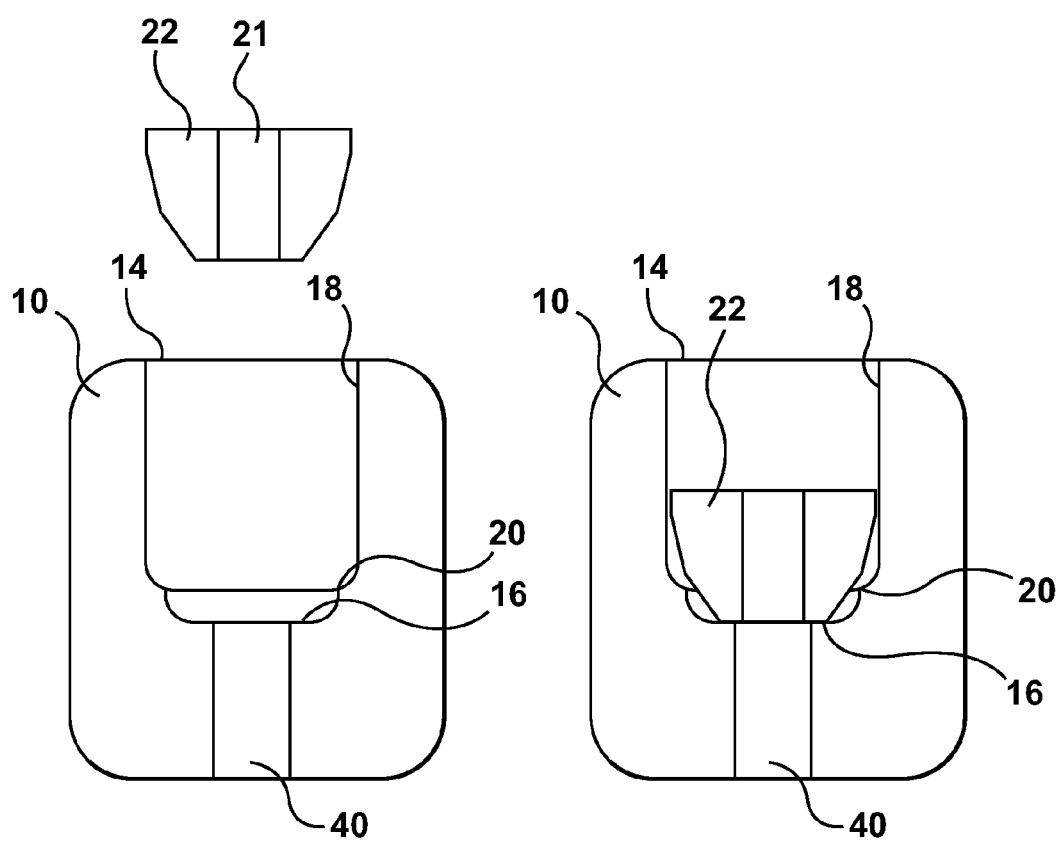

Referring now to FIG. 3E, a valve body 22 is positioned above the hole entrance 14. Referring now to FIG. 3F, the valve body 22 is received in the hole 12 defined in the component 10 so that the valve body 22 may be sealed against the stop ledge 16 of the component 10 for the case where the vestige is small enough. The radially-extending circumferential edge 20 does not interfere with the sealing arrangement between the valve body 22 and the component 10. According to an option, the profile assembly 104 matches the profile of the seal surface of a valve seat (an example of a component). The profile assembly 104 faces the entire inner circumference of the hole 12.

Referring to FIG. 3F, the valve body 22 defines the passageway 21, and it may be desired that the passageway 21 and the first hole 40 are lined up (are coaxially aligned relative to each other) so as to be in fluid communication once machined just so. The valve body 22 does not touch or contact the radially-extending circumferential edge 20, which is a desired outcome, so that there is no interference and therefore no leak from the passageway 21 and first hole 40. For the case where the valve body 22 contacts the radially-extending circumferential edge 20, this would be an undesired or unwanted outcome (this would represent an interference), so that the valve body 22 is prevented from properly seating (sealably seating) against component 10 at the stop ledge 16, and as a result of this interference, unwanted leakage may occur at the interface between passageway 21 and first hole 40.

Figure 4A:
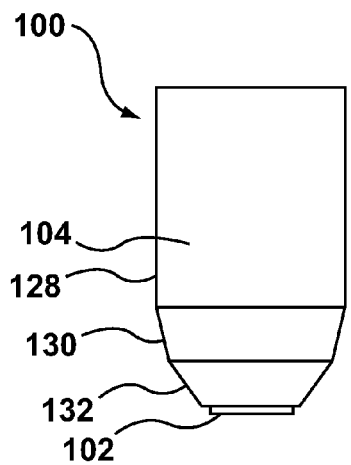
Figure 4B:
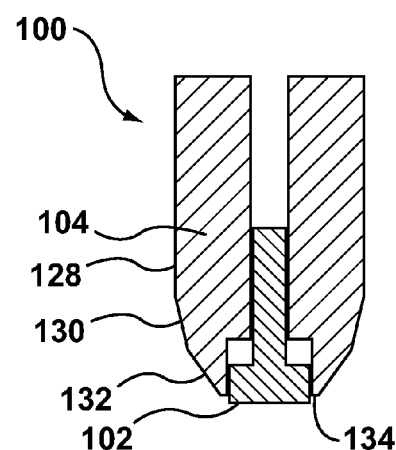
Figure 4C:
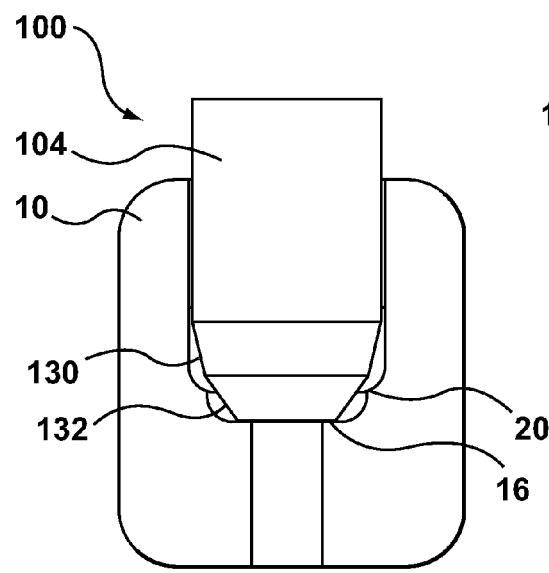

FIGS. 4A, 4B, 4C, 4D, 5A, 5B, 5C, 5D depict schematic examples of cross-sectional views of a tip portion of the gauge apparatus 100 of FIG. 1A. Referring now to FIG. 4A, there is depicted a close up view of the tip portion of the gauge apparatus 100. Referring now to FIG. 4B, there is depicted a cross-sectional view of the tip portion of the gauge apparatus 100 of FIG. 4A. The extension assembly 102 extends outwardly away from the profile assembly 104 (which is depicted in the retracted position). Referring now to FIG. 4C, there is depicted the gauge apparatus 100 received in the hole 12 of the component 10. The extension assembly 102 abuts the stop ledge 16. The radially-extending circumferential edge 20 does not interfere with the abutment between the extension assembly 102 and the stop ledge 16. The extension assembly 102 is further configured to extend axially along a longitudinal axis extending through the extension assembly 102, and the extension assembly 102 is configured to extend axially toward and to stop against a stop ledge 16 provided by a component 10. The profile assembly 104 is further configured to reciprocally coaxially travel relative to the extension assembly 102 protractedly toward and retractably away from the stop ledge 16. The profile assembly 104 does not make contact with the radially-extending circumferential edge 20 for a case where the size of the radially-extending circumferential edge 20 is less than the acceptable tolerance level.

Figure 4D:
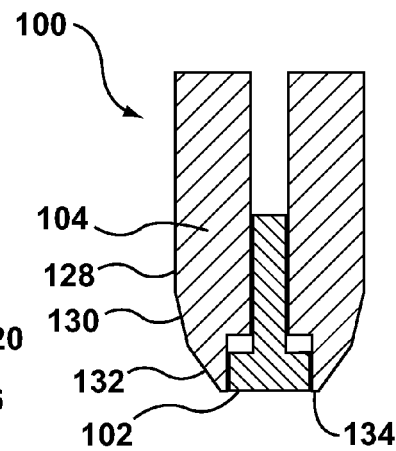

Referring now to FIG. 4D, there is depicted a cross-sectional view of the tip of the gauge apparatus 100 of FIG. 4C. The gauge-indicator assembly 106 indicates a zero value because the profile assembly 104 abuts the stop ledge 16 of the component 10.

Referring now to FIG. 5A, there is depicted a close up view of the tip portion of the gauge apparatus 100. Referring now to FIG. 5B, there is depicted a cross-sectional view of the tip portion of the gauge apparatus 100 of FIG. 5A. The extension assembly 102 extends outwardly away from the profile assembly 104 (which is depicted in the retracted position). Referring now to FIG. 5C, there is depicted the gauge apparatus 100 received in the hole 12 of the component 10. The extension assembly 102 does not abut the stop ledge 16 as a result of interference between the vestige (the radially-extending circumferential edge 20) and the profile assembly 104. The radially-extending circumferential edge 20 interferes with the abutment between the extension assembly 102 and the stop ledge 16. The profile assembly 104 is further configured to cease coaxial movement in response to making travel-interfering contact with the radially-extending circumferential edge 20 depending on the size of the radially-extending circumferential edge 20. The profile assembly 104 makes contact with the radially-extending circumferential edge 20 for a case where the size of the radially-extending circumferential edge 20 is greater than an acceptable tolerance level.

Referring now to FIG. 5D, there is depicted a cross-sectional view of the tip of the gauge apparatus 100 of FIG. 5C. The gauge-indicator assembly 106 indicates a non-zero value because the profile assembly 104 does not abut (contact) the stop ledge 16 of the component 10.

It may be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, components, or software code that is superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (and is not limited to)" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. A gauge apparatus, comprising:
an extension assembly dimensioned to engage a radially extending circumferential edge in a component;
a profile assembly being configured as a sleeve member slidably engaging an outer periphery of the extension assembly, the profile assembly further comprising an annular profile edge region and configured to reciprocally coaxially travel relative to the extension assembly, and the profile assembly being configured to cease coaxial movement in response to making travel-interfering contact with a travel-interfering surface associated with the circumferential edge; and
a gauge-indicator assembly being coupled to the profile assembly, and the gauge-indicator assembly being configured to indicate an amount travelled by the profile assembly once the profile assembly is stopped from moving coaxially, wherein the profile assembly is spring biased to a gauge-indicator assembly.

2. The gauge apparatus of claim 1, wherein:
the extension assembly is further configured to extend axially along a longitudinal axis extending through the extension assembly, and the extension assembly being configured to extend axially toward and to stop against a stop ledge provided by a component.

3. The gauge apparatus of claim 2, further including:
the component, wherein the component defines a hole having a hole entrance leading toward the stop ledge, the stop ledge is set apart from the hole entrance, the component has an inner surface surrounding the hole, and the component also has a radially-extending circumferential edge extending radially inward from the inner surface.

4. The gauge apparatus of claim 3, wherein:
the profile assembly is further configured to reciprocally coaxially travel relative to the extension assembly protractedly toward and retractably away from the stop ledge.

5. The gauge apparatus of claim 4, wherein:
the profile assembly is further configured to cease coaxial movement in response to making travel-interfering contact with the radially-extending circumferential edge depending on a size of the radially-extending circumferential edge.

6. The gauge apparatus of claim 5, further comprising:
a gauge-indicator assembly being coupled to the profile assembly, and the gauge-indicator assembly being configured to indicate an amount travelled by the profile assembly once the profile assembly is stopped from moving coaxially,
the gauge-indicator assembly is further configured to indicate the amount travelled by the profile assembly once the profile assembly is stopped from moving coaxially toward the stop ledge as a result of the profile assembly making interfering contact with the radially-extending circumferential edge.

7. The gauge apparatus of claim 3, wherein:
the profile assembly makes contact with the radially-extending circumferential edge for a case where a size of the radially-extending circumferential edge is greater than an acceptable tolerance level.

8. The gauge apparatus of claim 3, wherein:
the profile assembly does not make contact with the radially-extending circumferential edge for a case where a size of the radially-extending circumferential edge is less than an acceptable tolerance level.

9. The gauge apparatus of claim 1, further including:
the travel-interfering surface, wherein the travel interfering surface includes an amount of vestige material formed from material not removed from a component during a manufacturing process.

10. The gauge apparatus of claim 1, wherein:
the extension assembly is further configured to extend toward and to stop against a component, wherein the component includes an engine-block assembly of a vehicle; and
the profile assembly is further configured to radially extend from the outer periphery of the extension assembly.

11. The gauge apparatus of claim 1, wherein:
the profile assembly matches a profile of a seal surface of a valve seat.

12. The gauge apparatus of claim 1, wherein:
the profile assembly faces an entire inner circumference of a hole.

13. The gauge apparatus of claim 1, wherein:
the profile assembly includes:
an axially-aligned surface defined on the annular edge region;
a first tapered surface extending from the axially-aligned surface; and
a second tapered surface extending from the first tapered surface to a distal end of the profile assembly.

14. The gauge apparatus of claim 13, wherein:
the first tapered surface and the second tapered surface have:
an axial dimension extending axially relative to the profile assembly, and
a radial dimension extending radially relative to the profile assembly.

15. The gauge apparatus of claim 13, further comprising:
a gauge-indicator assembly being coupled to the profile assembly, and the gauge-indicator assembly being configured to indicate an amount travelled by the profile assembly once the profile assembly is stopped from moving coaxially, and
the profile assembly provides an end face extending axially from the profile assembly,
for a case where the end face contacts a travel-interfering body without the profile assembly contacting an unwanted vestige, the gauge-indicator assembly provides a zero reading; and
for the case where the end face does not contact the travel-interfering body because the profile assembly contacts the unwanted vestige, the gauge-indicator assembly provides a non-zero reading.

16. A gauge apparatus, comprising:
an extension assembly dimensioned to engage a radially extending circumferential edge in a component defining a groove;
a profile assembly being configured as a sleeve member slidably engaging an outer periphery of the extension assembly, the profile assembly being configured to reciprocally coaxially travel relative to the extension assembly, and the profile assembly being configured to cease coaxial movement in response to making travel-interfering contact with a travel-interfering surface associated with the circumferential edge;
a gauge-indicator assembly;
a connector;
a spring assembly;
a linkage assembly;

a piston assembly;
an air-gauging circuit; and
a frame assembly,
wherein:
the frame assembly is configured to support the gauge-indicator assembly, the frame assembly supports the air-gauging circuit, and the frame assembly abuts the extension assembly,
the piston assembly is configured to interact with the air-gauging circuit,
the linkage assembly connects the piston assembly to the profile assembly,
the spring assembly is positioned between the piston assembly and the extension assembly, the spring assembly biases the profile assembly in a retracted position, and
the connector slidably connects the profile assembly to the extension assembly in cooperation with the groove, so that the profile assembly slides axially relative to the extension assembly.

17. The gauge apparatus of claim 1, wherein
the extension assembly is further configured to extend toward and to stop against a component; and
the component includes an engine-block assembly of a vehicle.

* * * * *